(12) United States Patent
Takeda et al.

(10) Patent No.: US 7,542,152 B2
(45) Date of Patent: Jun. 2, 2009

(54) METHOD FOR MEASURING THICKNESS OF THIN FILM, METHOD FOR FORMING POLYCRYSTAL SEMICONDUCTOR THIN FILM, METHOD FOR MANUFACTURING SEMICONDUCTOR DEVICE, APPARATUS FOR MANUFACTURING THE SAME, AND METHOD FOR MANUFACTURING IMAGE DISPLAY DEVICE (75) Inventors: Kazuo Takeda, Hachioji (JP); Jun Gotoh, Mobara (JP); Daisuke Mutou, Mobara (JP)

(73) Assignee: Hitachi Displays, Ltd., Mobara (JP)

( * ) Notice: Subject to any disclaimer, the term of this patent is extended or adjusted under 35 U.S.C. 154(b) by 123 days.

(21) Appl. No.: 11/407,905

(22) Filed: Apr. 21, 2006

(65) Prior Publication Data

US 2006/0279744 A1 Dec. 14, 2006

(30) Foreign Application Priority Data

Apr. 22, 2005 (JP) ............................. 2005-124830

(51) Int. Cl.
*G01B 11/06* (2006.01)
(52) U.S. Cl. ....................................... 356/632; 356/432
(58) Field of Classification Search ......... 356/630–632, 356/432–435, 445–448; 382/144–145; 250/559.11–559.28
See application file for complete search history.

(56) References Cited

U.S. PATENT DOCUMENTS

| 4,320,967 | A | * | 3/1982 | Edgar | 356/51 |
| 4,922,112 | A | * | 5/1990 | Zierl et al. | 250/372 |
| 5,270,222 | A | * | 12/1993 | Moslehi | 438/7 |
| 2001/0028460 | A1 | * | 10/2001 | Maris et al. | 356/432 |
| 2002/0054290 | A1 | * | 5/2002 | Vurens et al. | 356/369 |

(Continued)

FOREIGN PATENT DOCUMENTS

JP 5-248826 9/1993

(Continued)

OTHER PUBLICATIONS

Simultaneous And Independent Determination of the Refractive Index and the Thickness of Thin Films by Ellipsometry, Vedam et al, Journal of the Optical Society Of America, vol. 58, No. 4, Apr. 1968.

(Continued)

*Primary Examiner*—Gregory J Toatley, Jr.
*Assistant Examiner*—Tri T Ton
(74) *Attorney, Agent, or Firm*—Antonelli, Terry, Stout & Kraus, LLP.

(57) ABSTRACT

A laser light is projected to a thin film deposited on a transparent substrate, and measurement is performed on the entire measurement area of the substrate, and transmission intensity is measured by a transmission light intensity monitor and reflection light intensity is measured by a reflection light intensity monitor at the same points and at the same number of points on the substrate. From the value of "A=1−(R+T)" where R represents reflectivity and T is transmissivity, film thickness is measured and evaluated from the relation of the value A with film thickness. By this procedure, film thickness can be determined on 10,000 substrates or more per minute and film thickness of thin film can be measured over the entire substrate surface.

13 Claims, 9 Drawing Sheets

Application example of manufacturing line

U.S. PATENT DOCUMENTS

| | | | |
|---|---|---|---|
| 2002/0135785 A1* | 9/2002 | Eriguchi | 356/630 |
| 2003/0197874 A1* | 10/2003 | Moghaddam et al. | 356/630 |
| 2006/0139655 A1* | 6/2006 | Tixier | 356/504 |

FOREIGN PATENT DOCUMENTS

| | | |
|---|---|---|
| JP | 2002-81916 | 3/2002 |
| JP | 2003-109902 | 4/2003 |
| JP | 2003-258349 | 9/2003 |

OTHER PUBLICATIONS

Multiple Determination of the Optical Constants of Thin-Film Coating Materials, Arndt, et al, Applied Optics, Oct. 15, 1984, vol. 23, No. 20.

* cited by examiner

FIG.5 a- Si film thickness distribution

FIG.8 (B) In case of excess side

FIG.8 (A) In case of shortage side

FIG.9

ND FOR MANUFACTURING IMAGE
METHOD FOR MEASURING THICKNESS OF THIN FILM, METHOD FOR FORMING POLYCRYSTAL SEMICONDUCTOR THIN FILM, METHOD FOR MANUFACTURING SEMICONDUCTOR DEVICE, APPARATUS FOR MANUFACTURING THE SAME, AND METHOD FOR MANUFACTURING IMAGE DISPLAY DEVICE

CLAIM OF PRIORTY

The present application claims priority from Japanese application JP2005-124830 filed on Apr. 22, 2005, the content of which is hereby incorporated by reference into this application.

FIELD OF THE INVENTION

The present invention relates to a method for measuring thickness of thin film deposited on a substrate at high speed. The invention also relates to a method for forming a polycrystal semiconductor thin film using the film thickness measuring method, and also to a method and an apparatus for manufacturing a semiconductor device. The invention further relates to a method for manufacturing an image display device.

In particular, the present invention is suitable as a method for reforming a semiconductor thin film, i.e. for reforming an amorphous semiconductor thin film to a polycrystal semiconductor thin film, a method for evaluation based on measurement of film thickness of amorphous semiconductor thin film before reforming, and also, the invention is suitable as a method and an apparatus for manufacturing a thin film transistor prepared from the semiconductor thin film and for manufacturing a semiconductor device including a flat panel type image display device having circuits comprising thin film transistors.

BACKGROUND OF THE INVENTION

In general, as a method for measuring film thickness—in particular, for measuring film thickness of multi-layer optical thin film, ellipsometry method is known, which is described in the Non-Patented Reference 1 given below. According to this method, a light is projected to a surface to be measured by changing polarizing status of the incident light. Then, the polarizing condition of the reflection light is determined and by performing parameter fitting of the measured data, optical constant and thickness of the thin film can be determined. This ellipsometry method is widely used in the inspection device for the thin film forming procedure in the semiconductor device manufacturing process.

In particular, the size of the substrate (normally, glass substrate) to be used in a flat type image display device (the so-called "flat panel display" (FPD); hereinafter, also called "display") represented by a liquid crystal panel is getting larger and larger in recent years. When a CVD device normally used for deposition of thin film is used to form thin film on the glass substrate, in-plane film thickness variation (amount of change in film thickness distribution on portions of glass substrate with different film deposition surface; variation of in-plane film thickness of thin film) is increased when the size of the glass substrate becomes larger. For this reason, it is necessary to have as many measuring points as possible on the surface of the glass substrate and to control the range of variation in film thickness on the surface of the glass substrate by measuring detailed distribution of the in-plane film thickness variation.

This is because, when the thin film deposited on the glass substrate is a silicon film, the in-plane film thickness variation may exert serious influence on the characteristics of semiconductor device to be formed on the silicon film. As an example, description will be given below on a manufacturing line of low temperature silicon thin film transistor (TFT) substrate (hereinafter, also called "TFT substrate") used in FPD.

The TFT substrate as described above comprises a pixel circuit and a driving circuit incorporated in silicon semiconductor thin film (hereinafter simply called "semiconductor") deposited on insulator substrate (hereinafter simply referred as "substrate"). Also, as driving elements to constitute the pixel circuit or the driving circuit, thin film transistor (TFT) is used in many cases. By using a polycrystal semiconductor thin film (typically called "polysilicon film or poly-Si film) instead of an amorphous semiconductor thin film (typically called "amorphous silicon film" or referred as "a-Si film") as active layer of the thin film transistor, it is possible to achieve image display with high precision and with high image quality.

The reason for this may be that the polycrystal silicon semiconductor thin film has higher mobility of carrier (electron in n-channel; hole in p-channel) compared with the amorphous silicon semiconductor thin film. As a result, high precision can be attained by reducing cell size (pixel size). For the formation of the thin film transistor deposited on normal poly-silicon semiconductor thin film, high temperature of 1000° C. or higher is required. On the other hand, in the technique to form poly-silicon semiconductor thin film at a low temperature on silicon layer by laser annealing, the substrate with semiconductor thin film deposited on it is not heated to high temperature, and it is possible to form the thin film transistor (TFT) with high mobility in low temperature process, and a low cost glass substrate can be used.

The effect that the mobility is high is advantageous in that the size of TFT can be reduced. This advantage leads to high brightness attained by the increase of opening ratio in the area of the openings other than TFT structure, comprising pixel circuits within pixel region for FPD, and this also results in the improvement of precise image quality. In the low temperature polysilicon TFT manufacturing process, the process influenced by the variation in film thickness of the amorphous silicon film is the annealing process using laser.

For example, in case annealing is performed by a pulsed excimer laser, and when it is checked how the grain size (average grain size) of polycrystal silicon to be crystallized is changed due to laser energy density, it is found that grain size of polycrystal silicon tends to be larger when laser energy is increased. However, when energy exceeds a certain energy threshold (when it is on the excess side), it is turned to microcrystal. This will be described later by referring to FIG. 7.

The dependency of polycrystal silicon grain size on laser energy is changed due to film thickness of the silicon thin film. If the film is thick, laser energy is turned to shortage in proportion to the increase of film thickness. If the film is thin, laser energy is turned to be in excess. Therefore, film thickness distribution causes the difference in the in-plane distribution of grain size of polycrystal silicon and also leads to the difference in average particle size for each substrate. Finally, it causes the variations of TFT characteristics. In "the Patented Reference 1", it is described that laser annealing is performed on the amorphous silicon substrate before laser annealing through adjustment of the energy necessary for reforming of the thin film by amorphous silicon film thickness measured by ellipsometry only for the first substrate in mass production lot.

Next, description will be given on a method for measuring film thickness other than the method based on ellipsometry. In "the Non-Patented Reference 2", a method for measuring film thickness called "R, T, t method" is described. According to this method, optical constant of thin film of single layer is determined by film thickness data measured by transmissivity and reflectivity of a vertical incident light, and this is not a method for determining film thickness. "The Patented Reference 2" describes a method for evaluating film thickness by projecting a light of multiple wavelengths and by measuring reflection spectra. This is also a method for determining film thickness by parameter fitting. "The Patented Reference 3" discloses a method called "BPR method". This is a method to evaluate film thickness through measurement of the dependency of reflection light intensity on reflection angle by using a projection system with multiple incident angles. This is also a method to determine film thickness by parameter fitting.

[Non-Patented Reference 1] JOSA, Volume 58 (1968), p. 526.

[Non-Patented Reference 2] Applied Optics 23 (1984), pp. 3571-3596.

[Patented Reference 1] JP-A-2003-258349

[Patented Reference 2] JP-A-2002-81916

[Patented Reference 3] Japanese Patent Publication No. 3337252

[Patented Reference 4] JP-A-2003-109902

DISCLOSURE OF THE INVENTION

[Problems to be Solved by the Invention]

As described above, the ellipsometry method is generally used for the measurement of optical multi-layer thin film. This is a method to determine complex index of refraction and thickness by performing parameter fitting on the measured data. This method is disadvantageous in that a light is projected by changing the polarizing condition in relation to time at standstill on the same measuring point and to measure the polarizing condition of the reflection light, which varies in relation to time. In this respect, a measurement mode on step-and-repeat basis is required, and it is not possible to measure while scanning at high speed. Thus, it is not suitable for short-time measurement of the objects such as glass substrate with large area used for large size image display device.

In the conventional methods as described above except the ellipsometry method, measurement can be performed while scanning. However, the process to determine the film thickness by parameter fitting is still a factor to require longer measuring time. In any way, none of the conventional methods has achieved the evaluation of the in-plane distribution of amorphous silicon film thickness over the entire surface of a large size substrate with area of one square meter at as many as 10,000 measuring points or more within the measuring time of one minute.

Next, description will be given on problems in the manufacturing line, which requires measurement of film thickness. In the laser annealing process to reform amorphous silicon film to polycrystal silicon film, it is necessary to measure film thickness in advance because there is influence from variations of film thickness of amorphous silicon film. The ellipsometry method, as described above, is used for this purpose. Devices for inspection of film thickness of a large size substrate of 730 mm×920 mm, such is the device produced by Sopra group in France, are known. The measuring time when these devices are used is about 10 seconds per each measuring point,—including moving in stage scanning. The measurement throughput is considered to be about 28 hours per substrate in case of the measurement made at 10,000 points over the entire surface of a large size substrate of the image display device. Because the throughput of laser annealing process is about 7 minutes per substrate, it is necessary to reduce the number of measuring points to 1/240, i.e. by about 42% or less, for the purpose of performing total inspection (100% inspection). However, this number of measuring points is still too small for the evaluation of the in-plane distribution of film thickness.

It is an object of the present invention to provide a method for measuring the film thickness of thin film, a method for forming polycrystal semiconductor thin film, a method and an apparatus for manufacturing semiconductor device, and a method for manufacturing image display device, by which it is possible to perform inspection over the entire surface of the substrate at 10,000 measuring points or more within one minute.

[Means for Solving the Problems]

Figure 1:
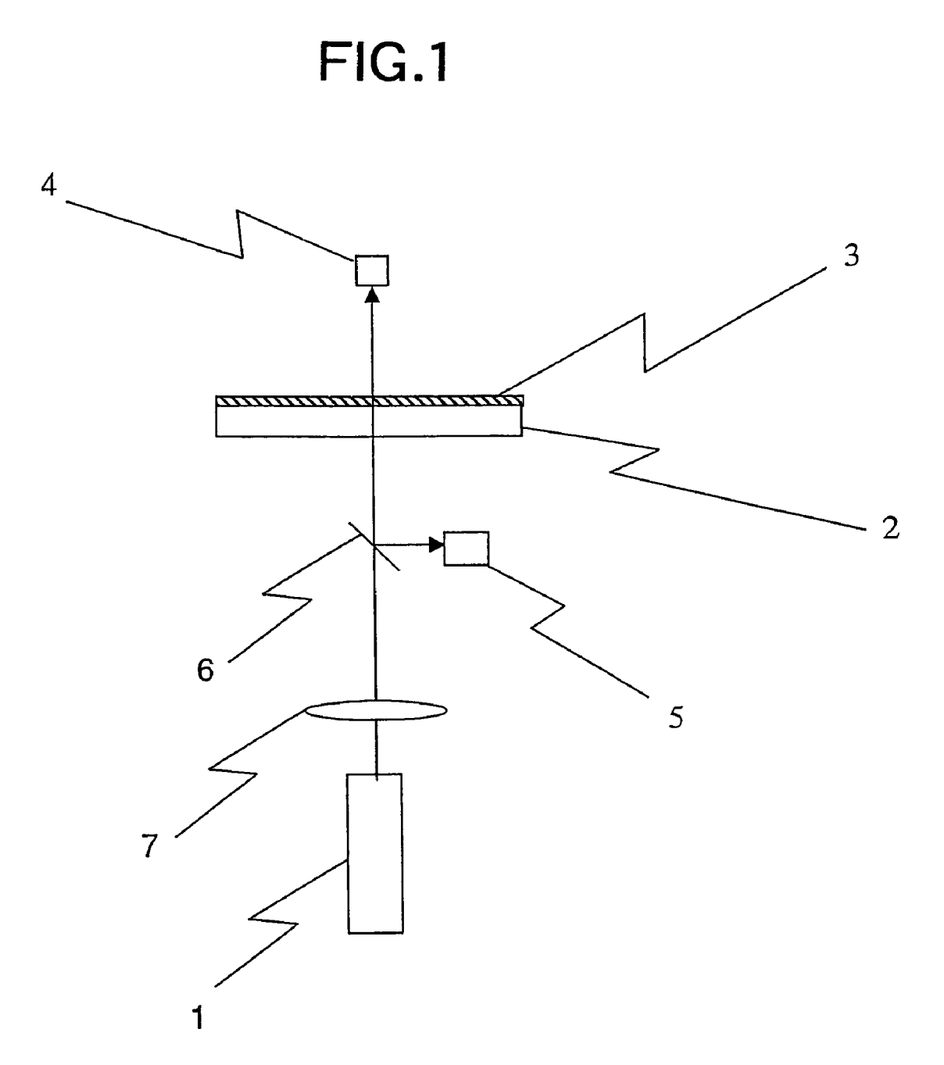
FIG. 1 is a drawing to explain a measuring optical system according to the present invention.

Now, description will be given on a method for measuring film thickness of a thin film with light absorbing property and deposited on a transparent substrate according to the present invention by referring to FIG. 1. FIG. 1 is a drawing to explain a measuring optical system according to the present invention. In FIG. 1, reference numeral 1 denotes a laser, numeral 2 denotes a glass substrate, i.e. a transparent substrate, numeral 3 represents an amorphous silicon thin film, i.e. a thin film with light absorbing property as described above, numeral 4 represents a transmission light intensity monitor, numeral 5 denotes a reflection light intensity monitor, 6 denotes a half-mirror, and 7 represents a lens. Here, description will be given, as shown in FIG. 1, on means for measuring film thickness by projecting a light with a wavelength within light absorption band of the thin film 3 to an amorphous silicon thin film 3 deposited on the glass substrate 2.

A light from the laser 1 is converged through the lens 7, and the light is projected as a projecting light vertically directed to the amorphous silicon thin film 3 deposited on the glass substrate 2. Scanning is performed by moving the projecting light or the glass substrate relatively to each other, and measurement is made on corresponding transmission light intensity and reflection light intensity at many points and at the glass substrate 2 over the entire measuring area on the glass substrate 2. Transmission light intensity is monitored by the transmission light intensity monitor 4, and reflection light intensity is monitored by the reflection light intensity monitor 5. The reflection light from the amorphous silicon thin film 3 is sampled using a partially-reflective mirror 6.

Next, a value A, i.e. $A=1-(R+T)$, where R represents reflectivity and T represents transmissivity, is determined. From the relation between the value A and the film thickness, film thickness is determined and evaluated. In general, the value A represents attenuation rate by factors other than transmission and reflection of energy of the projecting light, i.e. it is a sum of absorbance and scattering ratio. In case of the amorphous silicon thin film deposited by CVD on mirror surface of the glass substrate, the surface of the amorphous silicon thin film is also a mirror surface. Thus, scattering caused by surface roughness can be generally neglected, and the value A is equal to the absorbance in case of amorphous silicon film. Further, absorbance is a function of film thickness and complex index of refraction of the film. In case the object to be measured is an amorphous silicon film, for instance, the complex index of refraction can be set as a fixed parameter, and the film thickness can be determined from the value A.

Figure 2:
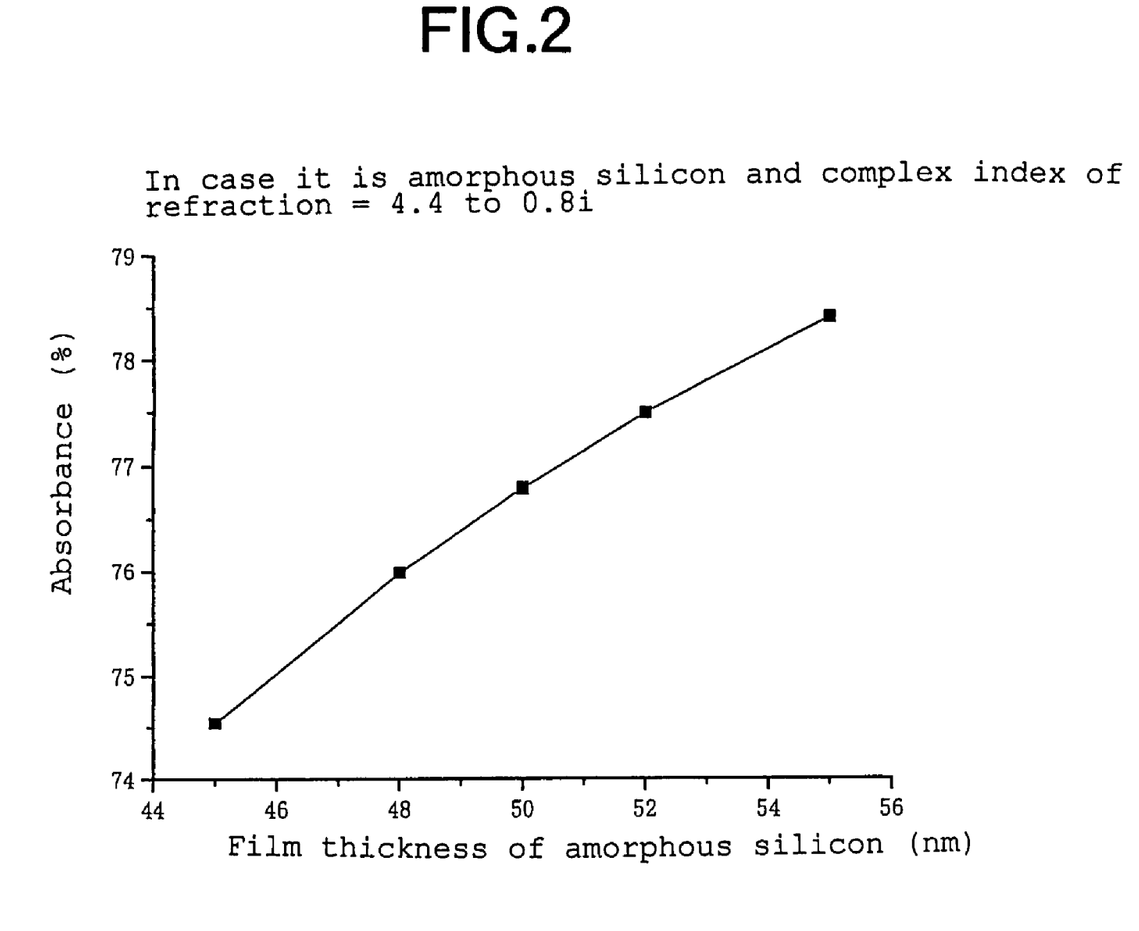
FIG. 2 is a diagram to explain relation between thickness of an amorphous silicon thin film and a value A as determined by numeral value simulation.

FIG. 2 is a diagram to explain the relation of the thickness of the amorphous silicon thin film determined by numerical simulation with the value A. In FIG. 2, a case where complex index of refraction of the amorphous silicon film is set to a range of 4.4-0.8 i is shown. Film thickness (nm) of the amorphous silicon thin film is represented on the axis of abscissa and absorbance (%) is represented on the axis of ordinate. As shown in FIG. 2, absorbance to film thickness of amorphous silicon thin film is turned to a monotone increasing function. As a result, film thickness can be determined from the value A.

Figure 3:
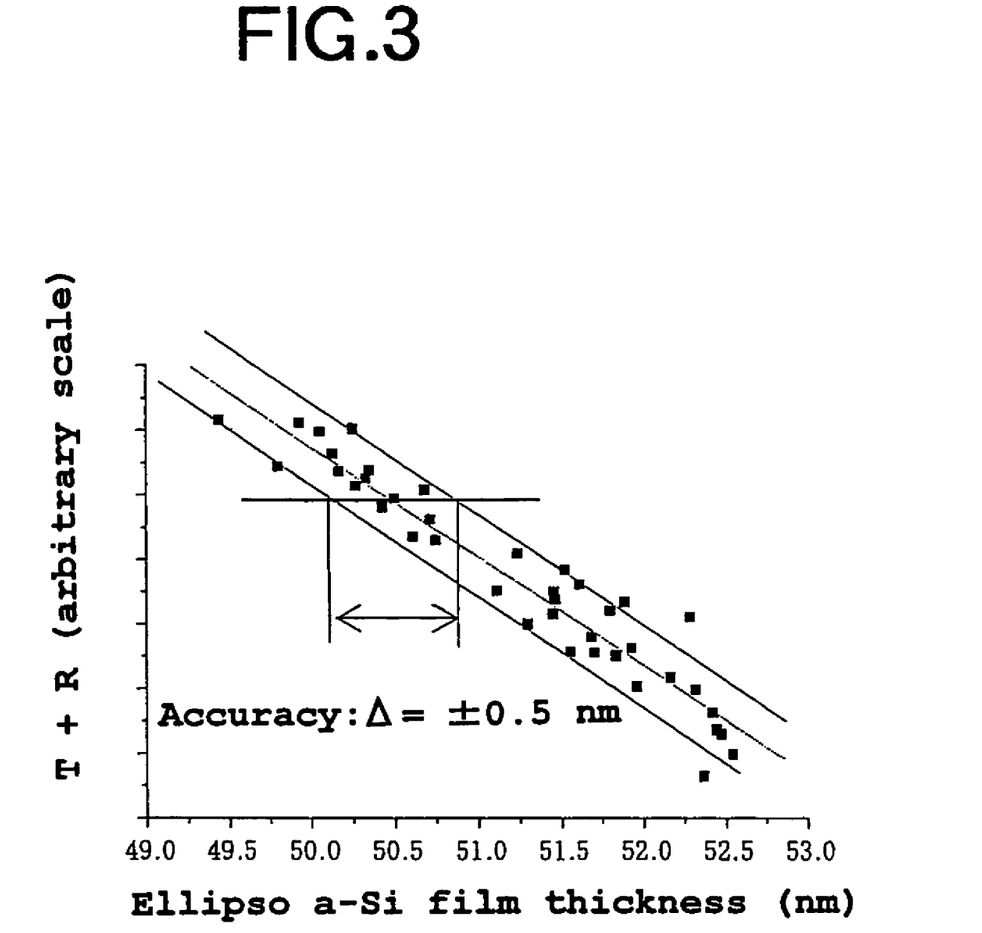
FIG. 3 is a diagram to explain the accuracy of the measuring method of the present invention. In the diagram, results of measurement of two or more in-plane points of the same sample substrate, where an amorphous silicon thin films are deposited on a glass substrate, are compared with results of measurement of film thickness based on "T+R" method and on ellipso method.

FIG. 3 is a diagram to explain the accuracy of the measuring method according to the present invention. In this diagram, the results of measurements at a plurality of in-plane points on the same sample of glass substrate deposited on amorphous silicon thin film are compared with the results of measurement on film thickness by "T+R" and ellipsometry method. Film thickness of a-Si by ellipsometry method is represented on the axis of abscissa, and the value of T+R (arbitrary scale) is represented on the axis of ordinate. As shown in FIG. 3, the measurement accuracy $\Delta$ is within $\pm 0.5$ nm. This principle of measurement is advantageous because reflection light intensity and transmission light intensity can be measured while scanning at high speed. Because there is no process of data processing of parameter fitting, measurement can be performed at the speed of 10,000 times or more compared with the ellipsometry method, and film thickness distribution can be determined at 10,000 measuring points or more within one minute.

Figure 4:
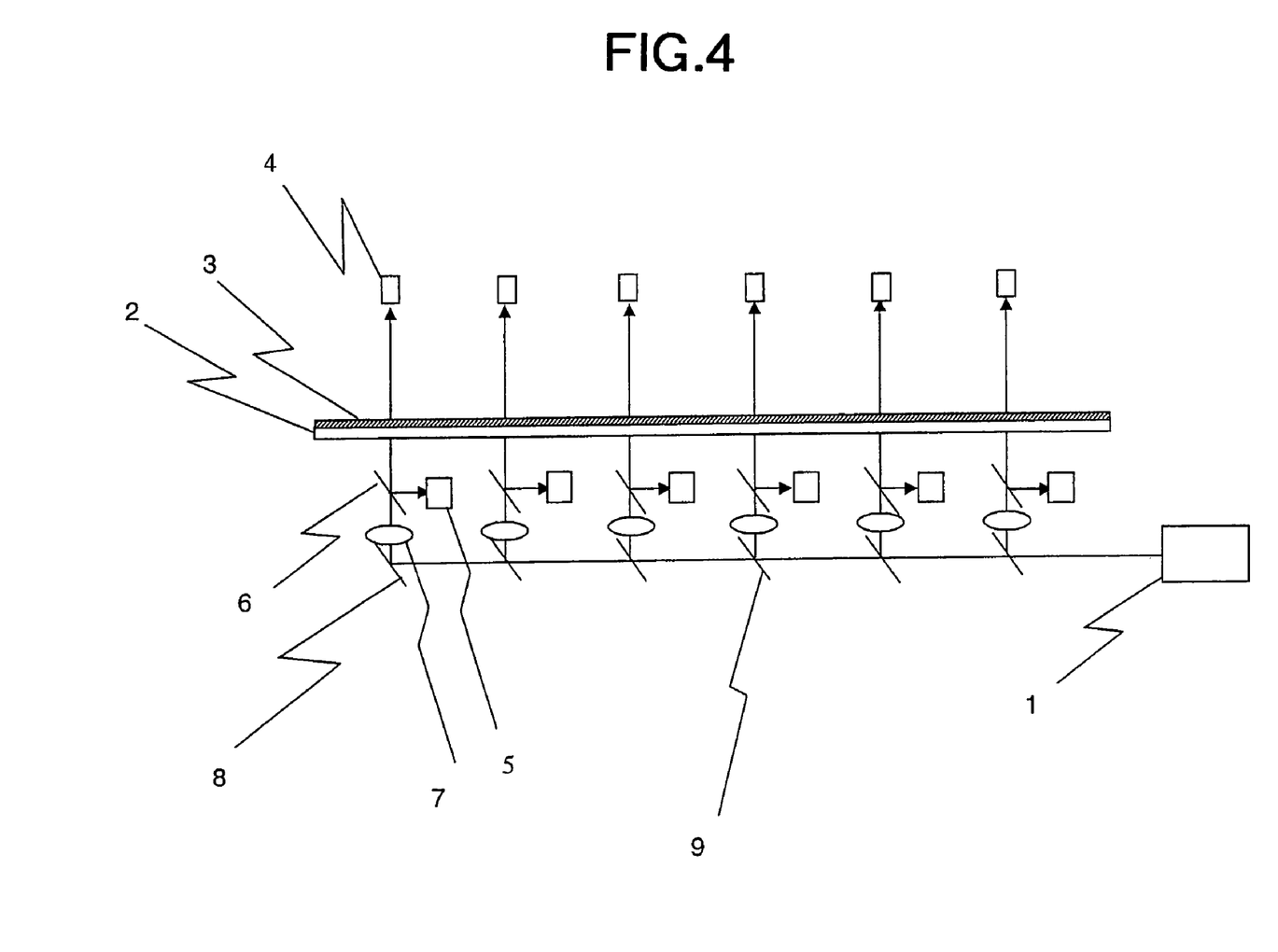
FIG. 4 is a drawing to explain an optical system of a multi-beam type measuring device for further improvement of throughput of the measurement of the optical system shown in FIG. 1.

FIG. 4 is a drawing to explain an optical system of the measuring device where the optical system of FIG. 1 is changed to a multi-beam type in order to have higher throughput in the measurement. In the figure, the same reference symbol represents the same functional portion. Reference numeral 8 denotes a reflection mirror, and numeral 9 denotes a partially-reflective mirror for branching off. By designing the measuring device as multi-beam type, the number of scanning can be reduced by the number of multi-beams compared with single beam type. As a result, the measurement throughput can be increased. FIG. 4 shows an example with 6 systems.

Figure 5:
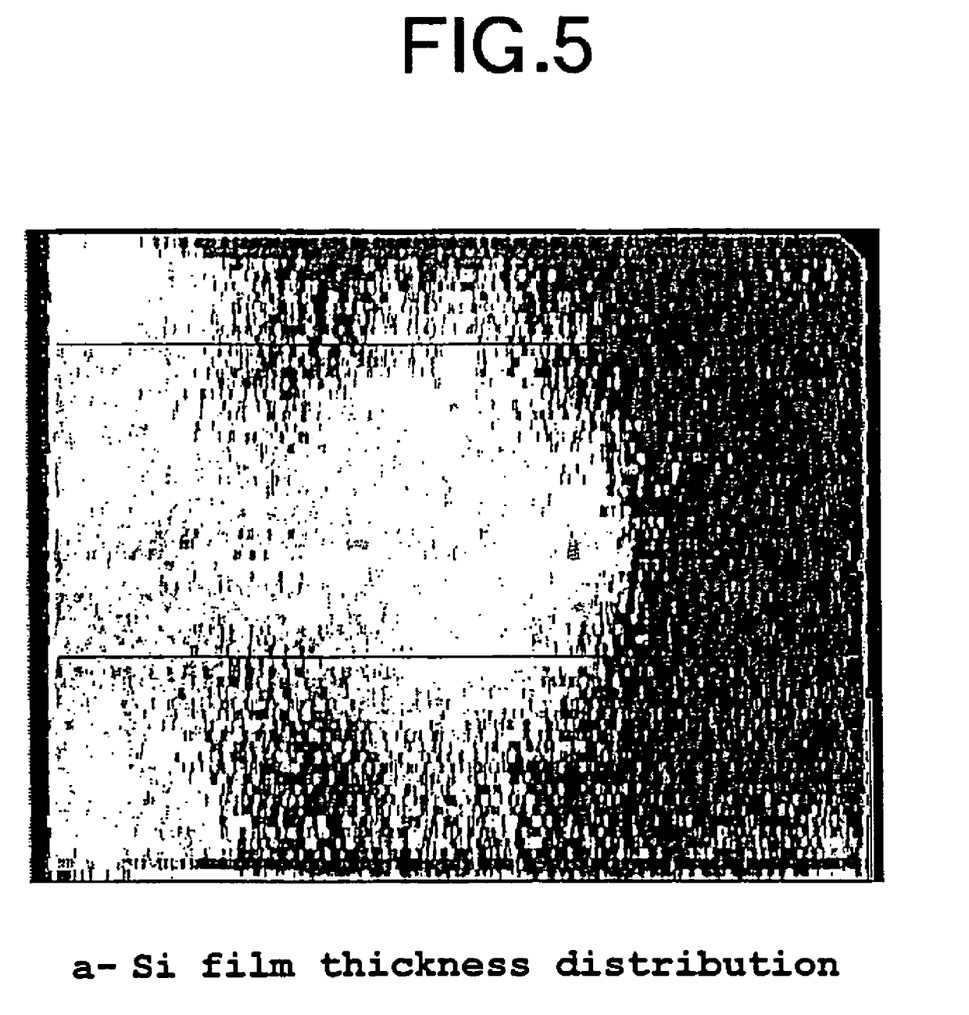
FIG. 5 is a photograph to show an example of measurement of in-plan distribution of film thickness of an amorphous silicon thin film deposited on a glass substrate in size of 730 mm×920 mm by the multi-beam type measuring device shown in FIG. 4.

FIG. 5 is a photograph to explain an example of measurement of in-plane distribution of film thickness of amorphous silicon thin film deposited on a glass substrate in size of 730 mm×920 mm by multi-beam type device of FIG. 4. In this example, the in-plane distribution could be obtained from 380,000 measuring points within the measuring time of 2 minutes. In the figure, dense portion represents a portion with higher film thickness, and light portion represents a region where film thickness is lower. The range of film thickness is from 53 nm to 49 nm. Now, description will be given below on the procedure to apply this measuring method on the manufacturing line.

Figure 6:
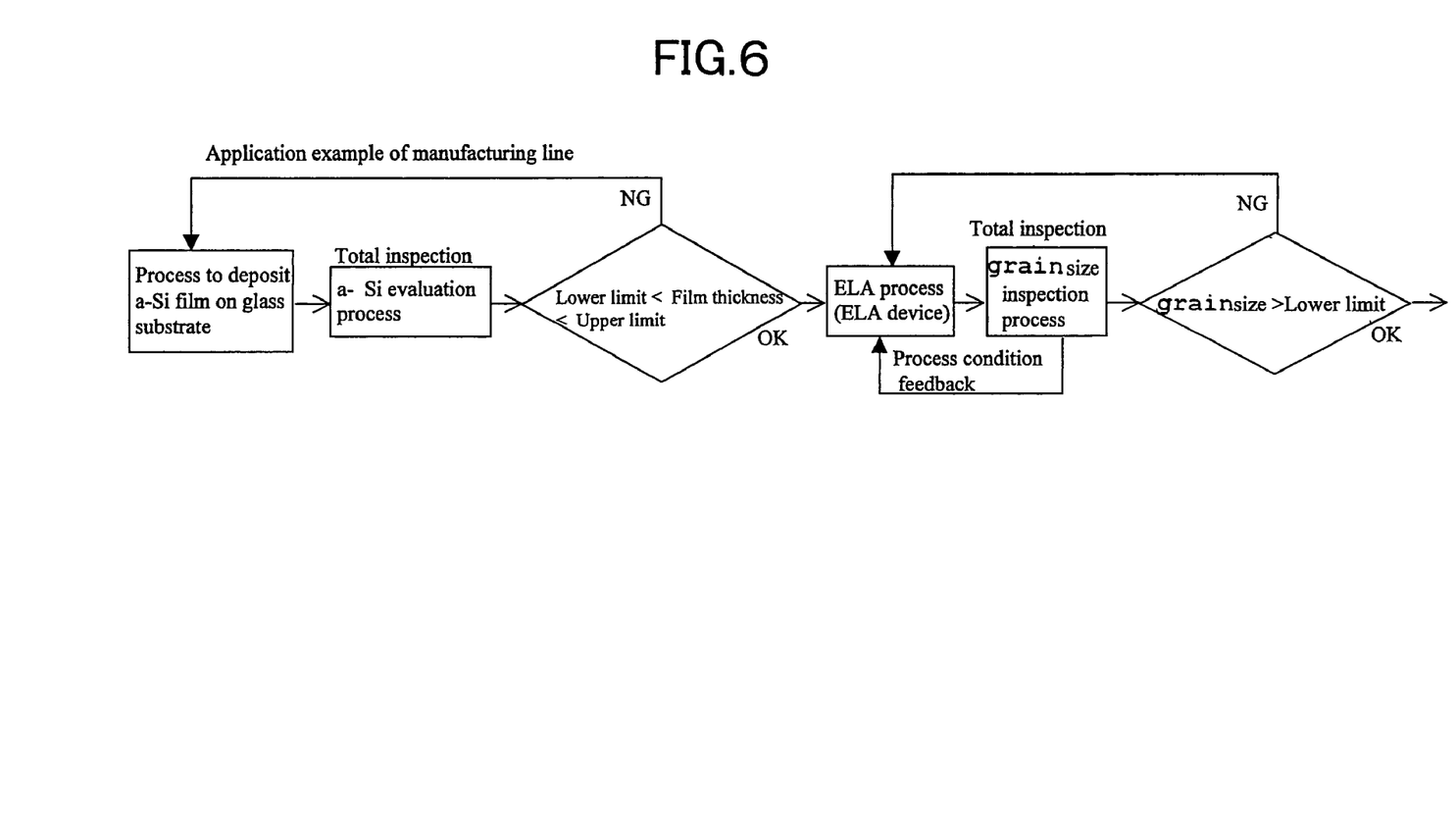
FIG. 6 is a block diagram to show film thickness measuring method of the present invention when it is applied on a process to manufacture a substrate for low temperature polysilicon TFT liquid crystal display device.

FIG. 6 shows a case where the method for measuring film thickness of the present invention is applied on a process to manufacture substrates for low temperature polysilicon TFT liquid crystal display device. The deposition of amorphous silicon (a-Si) thin film on glass substrate is carried out by CVD device. Processing time for each substrate is several minutes. As the inspection on a-Si thin film deposited in this process, 100% inspection by the method of the present invention is carried out. In this 100% inspection, it is evaluated whether the minimum value and the maximum value of film thickness is within control range or not, and this is evaluated according to the result of measurement on film thickness. If the result is deviated from the control range at least to some extent, the operation should be returned by feedback to (NG) film depositing condition. Also, it is desirable to carry out the feedback of the film depositing condition for each substrate so that film thickness is not deviated from the control range.

If film thickness distribution is within the control range (if it is OK), amorphous silicon thin film is reformed to polycrystal silicon film by a process using excimer laser annealing (ELA process). In this laser annealing process, the laser energy must be adjusted depending on film thickness of amorphous silicon thin film. The reasons are as follows: In general, the larger the grain size of crystal of polycrystal silicon semiconductor thin film is, the higher the mobility is increased. Thus, laser annealing must be conducted in such manner that grain size will be at the maximum value.

Figure 7:
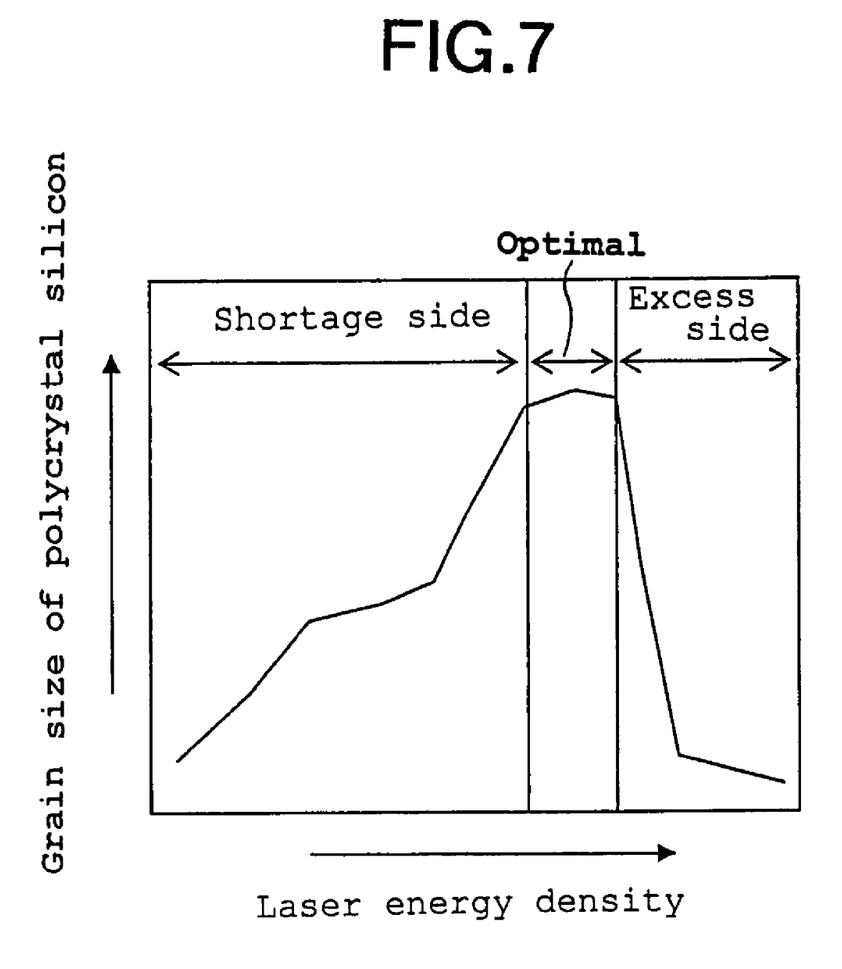
FIG. 7 is a diagram for schematically showing how grain size (average grain size) of polycrystal silicon crystallized is changed by laser energy density when it is annealed with a pulsed excimer laser with a wavelength of 308 nm.

FIG. 7 is a diagram schematically showing how particle size (average particle size) of polycrystal silicon crystallized during annealing by the pulsed excimer laser with a wavelength of 308 nm is changed due to laser energy density. In FIG. 7, laser energy density (relative value) is represented on the axis of abscissa, and grain size (relative value) of polycrystal silicon is represented on the axis of ordinate. As shown in FIG. 7, in the region where laser energy is in shortage as indicated on the shortage side in the figure, grain size of polycrystal silicon tends to be larger if laser energy is increased. However, when laser energy exceeds a certain energy threshold or more (the excess side), it is turned to microcrystal.

Grain size tends to be larger when laser energy is increased. When energy exceeds a certain energy threshold, it is turned to microcrystal. However, the microcrystal threshold on high energy side is varied according to the thickness of amorphous silicon thin film before laser irradiation. When the film is thin, it is shifted to low energy side. Because film thickness is not even over the entire substrate (in-plane), it is necessary to know the in-plane film thickness distribution of the substrate before laser annealing and to adjust so that grain size will be higher than the lower limit (control range) or more over the entire substrate.

Returning to FIG. 6, grain size inspection must be performed on polycrystal silicon after the amorphous silicon thin film is reformed to polycrystal silicon thin film by laser annealing process, and it should be identified whether the laser energy in the processing condition is in shortage or in excess. The result can be used by feedback to the processing condition of the next substrate.

Figure 8:
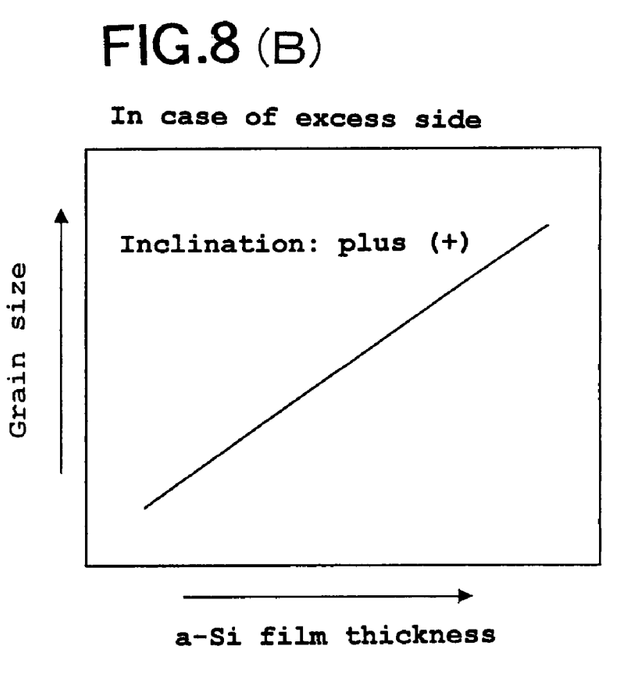
FIG. 8(A) and FIG. 8(B) each represents a diagram to show the change of particle size to film thickness of amorphous silicon thin film when laser energy is in shortage and when it is in excess respectively.

FIG. 8 (A) and FIG. 8 (B) each represents the changes of particle size with respect to film thickness of amorphous silicon thin film in a case where laser energy is in shortage and in a case where it is in excess respectively. If the results of judgment is on the energy shortage side as shown in FIG. 7, the thicker the film is, the more the energy is in shortage. In this case, as shown on the shortage side of FIG. 8 (A), the thicker the film is, the smaller the grain size is (the inclination is in minus (−) direction).

On the other hand, in case the energy is on the excess side as shown in FIG. 7, the thicker the film is, the more the excess of energy is alleviated. That is, as shown on the excess side of FIG. 8 (B), the thicker the film is, the larger the grain size is (the inclination is in plus (+) direction). Therefore, by checking the dependency of grain size on film thickness, it is possible to judge whether the energy is in excess or in shortage, depending on whether the inclination is in plus (+) direction or in minus (−) direction. Based on the result, if the judgment in FIG. 6 shows that particle size is at lower limit or higher (i.e. if it is NG), laser energy can be adjusted by feedback to ELA process.

In the procedure as described above, high speed measuring method must be performed on grain size similarly to the high speed measuring method of film thickness of the present invention. For this purpose, the method described in the Patented Reference 4 as filed by the present applicant should be carried out as the method for grain size inspection. However, the grain size inspecting method is not limited to this.

In the manufacturing line to carry out the method for manufacturing semiconductor device to the transparent substrate as described above, for instance, in the manufacturing line to manufacture display device on glass substrate, as many film thickness measuring devices as the amorphous semiconductor thin film depositing devices must be used and at least as many polysilicon particle size inspecting devices as the laser annealing devices must be used. By performing 100% inspection on the film thickness in-plane distribution and 100% inspection on the grain size in-plane distribution, feedback for each substrate is carried out in the laser annealing process.

[Effects of the Invention]

According to the present invention, it is possible to perform measurement on film thickness with higher throughput compared with the conventional methods. Further, by applying this evaluation method to the manufacturing line of the substrates for semiconductor device or image display device, it is possible to carry out total (100%) inspection at many measuring points as possible sufficient to obtain in-plane distribution information on film thickness of the amorphous semiconductor thin film, and the manufacturing method with high efficiency can be achieved.

BEST MODE FOR CARRYING OUT THE INVENTION

Embodiment 1

Now, description will be given on Embodiment 1 of the invention by referring to FIG. 1 to FIG. 5. On the surface of a glass substrate 2 of about 0.5 mm in thickness, a primer layer is prepared, which comprises a silicon nitride film of about 50 nm in thickness and a silicon oxide film of about 100 nm in thickness. On the primer layer, a sample substrate is prepared, on which an amorphous silicon thin film of about 50 nm in thickness is deposited by CVD device. On this sample substrate 2, a laser light 1 with a wavelength of 532 nm is projected vertically from rear surface. The laser light of this wavelength is absorbed only by the amorphous silicon thin film 3. The diameter of the laser beam is limited to about 200 microns by using a lens 7.

A light reflected from the sample substrate 2 is branched off from the projection optical axis by a half-mirror, and reflection light intensity is measured by a reflection light intensity monitor 5. Transmission light intensity is measured by a transmission intensity monitor 4. By this measurement, a value of "1−(T+R)" is determined at each measuring point. FIG. 5 shows the results of mapping of these values. Substrate size in this map is: 730 mm×920 mm. The number of the measuring points is 380,000 points, and the measurement time is 2 minutes. On the optical system where the measurement of FIG. 5 is performed, the optical system of FIG. 1 is designed in multi-beam type as shown in FIG. 4. As a result, the measurement can be achieved at higher speed because measured areas on the large size substrate are divided for each detection system and the measurement is performed in parallel. In the multi-beam optical system, the beam is divided to each projection optical system by the half-mirror 9 when seen from the laser light source 1, the system in the final stage is not the half-mirror 9 but a reflection mirror 8.

Embodiment 2

Referring to FIG. 6, description will be given now on Embodiment 2, in which the evaluation method of the present invention is applied to a process to manufacture a substrate for low temperature polysilicon TFT liquid crystal substrate. As shown in FIG. 6, in this manufacturing line, a crystallizing process by laser annealing is included after the process to deposit amorphous silicon thin film. In the deposition process of the amorphous silicon thin film, processing time of each substrate is several minutes. For the inspection of this process, total inspection (100% inspection) of film thickness according to the method of the present invention is carried out. As shown in FIG. 6, in this total inspection, it is inspected whether the minimum value or the maximum value of film thickness is within the control range or not. If it is out of the control range, the process is brought by feedback to the film depositing condition. Further, feedback operation is also performed for each substrate so that the film thickness is not deviated from the control range.

Further, in the process where the amorphous silicon thin film is reformed to polycrystal silicon thin film by laser annealing, it is necessary to regulate laser energy by adjusting the film thickness of the amorphous silicon thin film. The reasons are as follows: In general, the larger the grain size of the crystal of polycrystal silicon thin film is, the higher the mobility is increased. When grain size is small, the mobility is low. Therefore, in order to maintain the characteristics of TFT on a constant level, the laser annealing must be carried out so that grain size is kept to a certain fixed value or more.

However, as shown in FIG. 7, particle size tends to be larger with the increase of laser energy, and when energy reaches a threshold or more, it is turned to microcrystal. This dependency of particle size on laser energy is changed due to film thickness. If the film is thick, laser energy becomes in shortage to a certain extent in proportion to thickness. If the film is thin, laser energy is shifted toward the excess. The amount of this shifting is about 0.7% per 1 nm in the change of film thickness when average film thickness is in the range of 50 nm.

As described above, particle size is decreased in both cases, i.e. when laser energy is in shortage or it is in excess. There is difficulty in that the condition of energy shortage or excess is changed due to the variation in film thickness even when laser is very stable and there is no change in energy. To overcome this difficulty, it is necessary to perform total inspection on in-plane distribution of grain size. For the inspection of grain size, the method described in the Patented Reference 4 is used as the total inspection for grain size. The method to inspect grain size is not limited to this, and it will suffice if total inspection can be carried out on the entire surface of the substrate. This inspection is the process to inspect the grain size as shown in FIG. 6.

Next, referring to FIG. 7 and FIG. 8, description will be given on a method for judging whether laser energy is in excess or in shortage with respect to the optimal condition as seen from dependency of particle size on laser energy and from dependency of amorphous silicon thin film on film thickness. If it is on energy shortage side as shown in FIG. 7, the thicker the film is, the more the energy is in shortage. In the case of the shortage side shown in FIG. 8(A), the thicker the film is, the smaller the grain size will be. On the other hand, if it is on the energy excess side, the thicker the film is, the more the energy excess is alleviated. As shown in the case of the excess of FIG. 8(B), the thicker the film is, the larger the grain size will be. Therefore, it is possible to judge whether energy is in excess or in shortage by checking the dependency of particle size on film thickness and by finding whether the inclination is in plus (+) direction or in minus (−) direction. Based on the result, laser energy can be adjusted.

Figure 9:
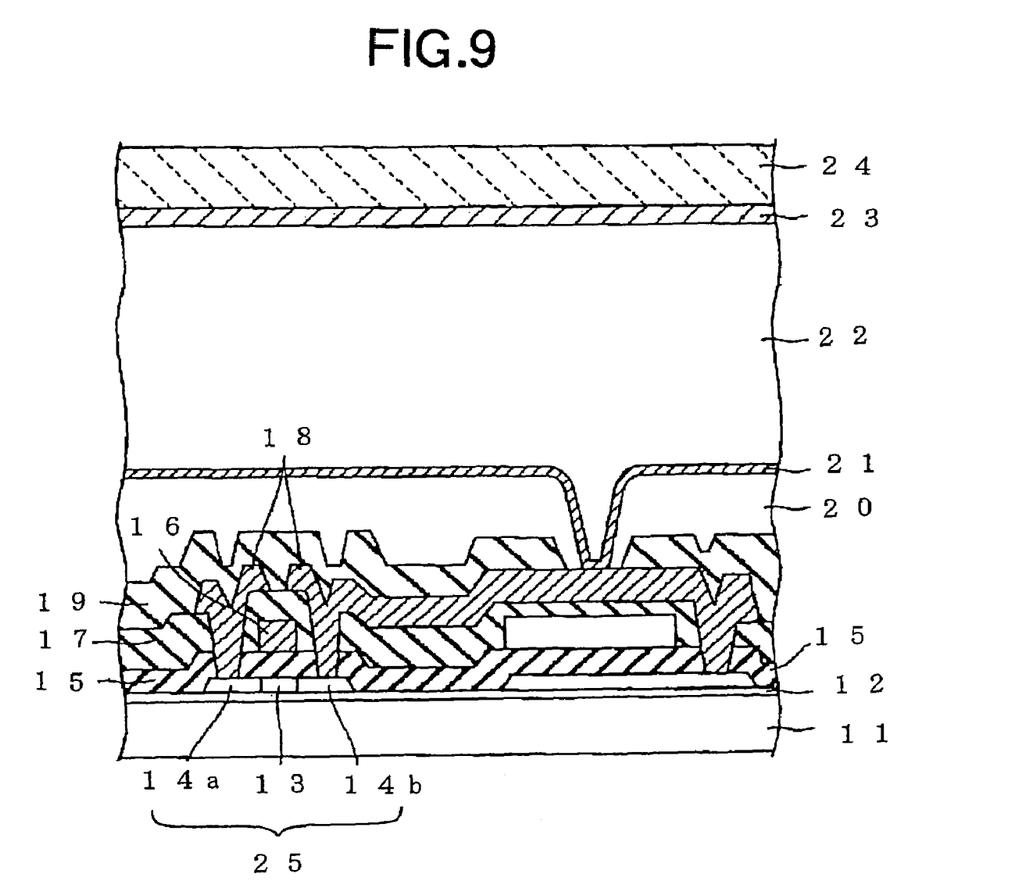
FIG. 9 is a cross-sectional view to explain the arrangement of an essential portion of a liquid crystal display device of active matrix type as an example of an image display device of the present invention.

FIG. 9 is a cross-sectional view to explain an arrangement of an essential portion of a liquid crystal display device of active matrix type as an example of the image display device according to the present invention. The liquid display device is designed as follows: Between a glass substrate 11, which comprises a thin film transistor 25, a color filter 20 and a pixel electrode 21, and a counter glass substrate 24 with a counter electrode 23, a liquid crystal 22 is interposed and sealed. On the boundary between the liquid crystal 22 and each of the substrates, an alignment film is deposited (not shown in the figure). The glass substrate 11 corresponds to the glass substrate where the semiconductor thin film is deposited as explained in the embodiments described above.

On the surface of the glass substrate 11, a primer layer (a laminated film of silicon nitride and silicon oxide) 12 is formed. On it, an amorphous silicon semiconductor layer is deposited, and it is reformed to a layer of polycrystal silicon thin film by laser annealing in the present invention. The thin film transistor 25 is incorporated in the layer of polycrystal silicon thin film prepared by laser annealing. Namely, by doping impurities on both sides of the semiconductor layer 13, which comprises polycrystal silicon semiconductor thin film, a source side semiconductor layer 14a made of polycrystal silicon semiconductor thin film and a drain side semiconductor layer 14b made of polycrystal silicon are formed. On it, a gate electrode 16 is deposited via a gate oxide film (a gate insulating layer) 15.

A source/drain electrode 18 is connected to the source side semiconductor layer 14a and the drain side semiconductor layer 14b respectively via contact hole formed on an interlayer insulator 17, and a protective film 19 is deposited on it. A color filter 20 and a pixel electrode 21 are formed on the protective film 19.

The thin film transistor 25 constitutes a pixel circuit of the liquid crystal display device. It is selected according to a selection signal from a scan driver circuit (not shown), and a pixel electrode 511 is driven by an image signal from a signal line driving circuit (not shown). An electric field is formed between the pixel electrode 511 thus driven and a counter electrode 513 with a counter glass substrate 514 on inner surface. By this electric field, molecular orientation direction of a liquid crystal 512 is controlled and the display is performed. In the liquid crystal display device as shown in FIG. 9, the color filter 20 is provided on the glass substrate 11 where the thin film transistor 25 is formed. This color filter may be provided on the counter glass substrate 24 comprising the counter electrode 23. It is desirable that a light shielding film (black matrix) is formed between the color filters.

The thin film transistors to constitute the scan driving circuit and the signal line driving circuit may be prepared by the polycrystal silicon semiconductor thin film—similarly to the pixel circuit as described above. The present invention is not limited to the liquid crystal display device and may be applied to any type of image display device such as organic EL display device.

What is claimed is:

1. A method for evaluation of a thin film formed on a transparent substrate, wherein said method comprising the steps of:

projecting a laser light from a single laser source of light with a single wavelength in an absorption band of the thin film on said thin film, and measuring reflection light intensity and transmission light intensity using a plurality of sensors forming at least one pair of sensors where the sensors of each pair are arranged on opposite sides of a surface of the thin film;

obtaining a light absorption amount of said thin film from a linear sum of the reflection light intensity and the transmission light intensity;

obtaining a thin film thickness and an in-plane distribution of the thin film thickness by using said light absorption amount;

laser annealing said thin film using an annealing laser having an annealing laser energy adjusted in accordance with said obtained thin film thickness;

obtaining an in-plane distribution of a grain size in said thin film after said laser annealing of the thin film;

determining an optimal range of said annealing laser energy by comparing said thin film thickness in-plane distribution with said in-plane distribution of grain size so that an increase of the grain size with said thin film thickness increase indicates an excess of said annealing laser energy, and decrease of the grain size with said thin film thickness increase indicates a shortage of said annealing laser energy; and adjusting said annealing laser energy to said optimal range for processing a subsequent thin film formed on said transparent substrate.

2. A method for evaluation of a thin film according to claim 1, said method further comprising the steps of:

determining a reflectivity and a transmissivity of said thin film from said reflection light intensity and said transmission light intensity as measured; and calculating thickness of the thin film by using said reflectivity and said transmissivity, and by using an optical constant of a material constituting said thin film at the wavelength of the projected light.

3. A method for evaluation of a thin film according to claim 1, wherein said transparent substrate is a glass substrate, and said thin film is an amorphous silicon thin film; and said laser light from the single laser source of light having a wavelength such that the laser light from the single laser source of light is absorbed by said amorphous silicon thin film and substantially not absorbed by said glass substrate.

4. A method for evaluation of a thin film according to claim 1, wherein said transparent substrate is a glass substrate, and said thin film is a multi-layer thin film; and wherein said light absorption amount of said laser light from the single laser source of light with the single wavelength on a substance other than the multi-layer thin film to be measured is negligible.

5. A method for evaluation of a thin film according to claim 1, wherein said thin film is an amorphous silicon thin film layer in a laminated film, said laminated thin film comprising a silicon nitride film formed on said glass substrate and a silicon oxide film formed on said silicon nitride film; and wherein said laser light from the single laser source of light with said single wavelength in a range of 450 nm to 600 nm is projected.

6. A method for evaluation of a thin film according to claim 1, wherein said laser light from the single laser source of light impacts the thin film at a substantially perpendicular direction to said transparent substrate.

7. A method for evaluation of a thin film formed on a transparent substrate, wherein said method comprising the steps of:

emitting a laser light from a single laser source of light with a single wavelength in an absorption band of the thin film;

splitting the laser light into a plurality of laser light beams and projecting each laser light beam on a separate measuring point on the thin film;

measuring reflection light intensity and transmission light intensity using a plurality of pairs of sensors, each pair having sensors arranged on the opposite sides of a surface of the thin film for a corresponding one of the plurality of laser light beams;

obtaining a light absorption amount for each measuring point of said thin film from a linear sum of the reflection light intensity and the transmission light intensity;

evaluating the thin film thickness for each measuring point by using said light absorption amount and generating an in-plane distribution of the thin film thickness;

laser annealing said thin film using an annealing laser having an annealing leaser energy adjusted in accordance with said obtained thin film thickness;

obtaining an in-plane distribution of a grain size in said thin film after said laser annealing of the thin film;

checking a dependency of the grain size on the thin film thickness and determining whether the annealing laser energy is in excess or in shortage from a sign of an inclination of said dependency of the grain size on the thin film thickness; and adjusting said annealing laser energy for processing a subsequent thin film formed on said transparent substrate based on the determination.

8. A method for evaluation of a thin film according to claim 7, wherein said method comprising the steps of:

determining at each measuring point, a reflectivity and a transmissivity of said thin film from said reflection light intensity and said transmission light intensity as measured; and calculating a thickness of the thin film at each measuring point using said reflectivity and said transmissivity, and an optical constant of a material constituting said thin film at the wavelength of the projected light.

9. A method for evaluation of a thin film according to claim 7, wherein said transparent substrate is a glass substrate, and said thin film is an amorphous silicon thin film; and said laser light from the single laser source of light having a wavelength such that the laser light from the single laser source of light is absorbed by said amorphous silicon thin film and substantially not absorbed by said glass substrate.

10. A method for evaluation of a thin film according to claim 7, wherein said transparent substrate is a glass substrate, and the thin film is a multi-layer thin film; and wherein said light absorption amount of said laser light from the single laser source of light with such the single on a substance other than the multi-layer thin film to be measured is negligible.

11. A method for evaluation of a thin film according to claim 7, wherein said thin film is an amorphous silicon thin film layer in a laminated film, said laminated thin film comprising a silicon nitride film formed on said glass substrate and a silicon oxide film formed on said silicon nitride film; and wherein the laser light from the single laser source of light with said single wavelength in a range of 450 nm to 600 nm is projected.

12. A method for evaluation of a thin film according to claim 7, wherein each of the plurality of laser beams is arranged to measure the thin film thicknesses at each measuring point in parallel.

13. A method for evaluation of a thin film according to claim 7, wherein each of the plurality of laser light beams impact the measuring points on the thin film at a substantially perpendicular direction to said transparent substrate.

* * * * *